United States Patent [19]
Yoo

[11] Patent Number: 5,685,337
[45] Date of Patent: Nov. 11, 1997

[54] SOLENOID VALVE WITH A HINGED STRUCTURE

[75] Inventor: Jang-Yeol Yoo, Seoul, Rep. of Korea

[73] Assignee: Daewoo Electronics Co., Ltd., Seoul, Rep. of Korea

[21] Appl. No.: 619,335

[22] Filed: Mar. 21, 1996

[30] Foreign Application Priority Data

Aug. 18, 1995 [KR] Rep. of Korea .................... 95-25382

[51] Int. Cl.$^6$ ............................................. F15B 13/044
[52] U.S. Cl. .................. 137/596.17; 137/870; 251/129.2; 303/119.2
[58] Field of Search ........................... 137/596.17, 870; 251/129.2; 303/119.2

[56] References Cited

U.S. PATENT DOCUMENTS

| | | | |
|---|---|---|---|
| 2,570,450 | 10/1951 | Hottenroth | 137/870 X |
| 3,024,811 | 3/1962 | McKinley | 251/129.2 X |
| 4,155,604 | 5/1979 | Fenart | 303/119.2 |
| 4,250,924 | 2/1981 | Sakakibara et al. | 137/596.17 X |
| 4,526,203 | 7/1985 | Leiber | 137/596.17 X |
| 4,527,590 | 7/1985 | Kolze | 137/596.17 |
| 4,765,693 | 8/1988 | Stegmaier | 137/596.17 X |
| 4,840,434 | 6/1989 | Leiber | 303/119.2 X |

FOREIGN PATENT DOCUMENTS 865634  4/1961  United Kingdom ................. 137/870

Primary Examiner—Gerald A. Michalsky
Attorney, Agent, or Firm—Beveridge, DeGrandi, Weilacher & Young LLP

[57] ABSTRACT

A 2-position 3-way solenoid valve is disclosed having a hinged structure. The solenoid valve includes a hollow cylindrical housing and first and second covers hermetically coupled to both ends of the housing. The first cover has first and third ports, and the housing has a second port. A diaphragm divides an inner chamber within the housing into first and second chambers, and the first to third ports are communicated with the first chamber. The second chamber contains an armature, a solenoid assembly and a core, and the armature is fixed to a push rod which extends to the first chamber through a diaphragm hole. A first spool for opening/closing the first port is provided to an end of the push rod within the first chamber. A step is provided to coupling portion of the first spool and the push rod by the difference of their diameters, and a valve lever extends perpendicularly to the push rod to engage with the step. A second spool for opening/closing the third port is fixed to an end of the valve lever in a perpendicular relationship. The valve lever is connected to, by a pin, a supporting rod having one end thereof fixed to the first cover to rock both ends of the valve lever. A spring is disposed between the valve lever and the first cover to surround the first spool.

6 Claims, 6 Drawing Sheets

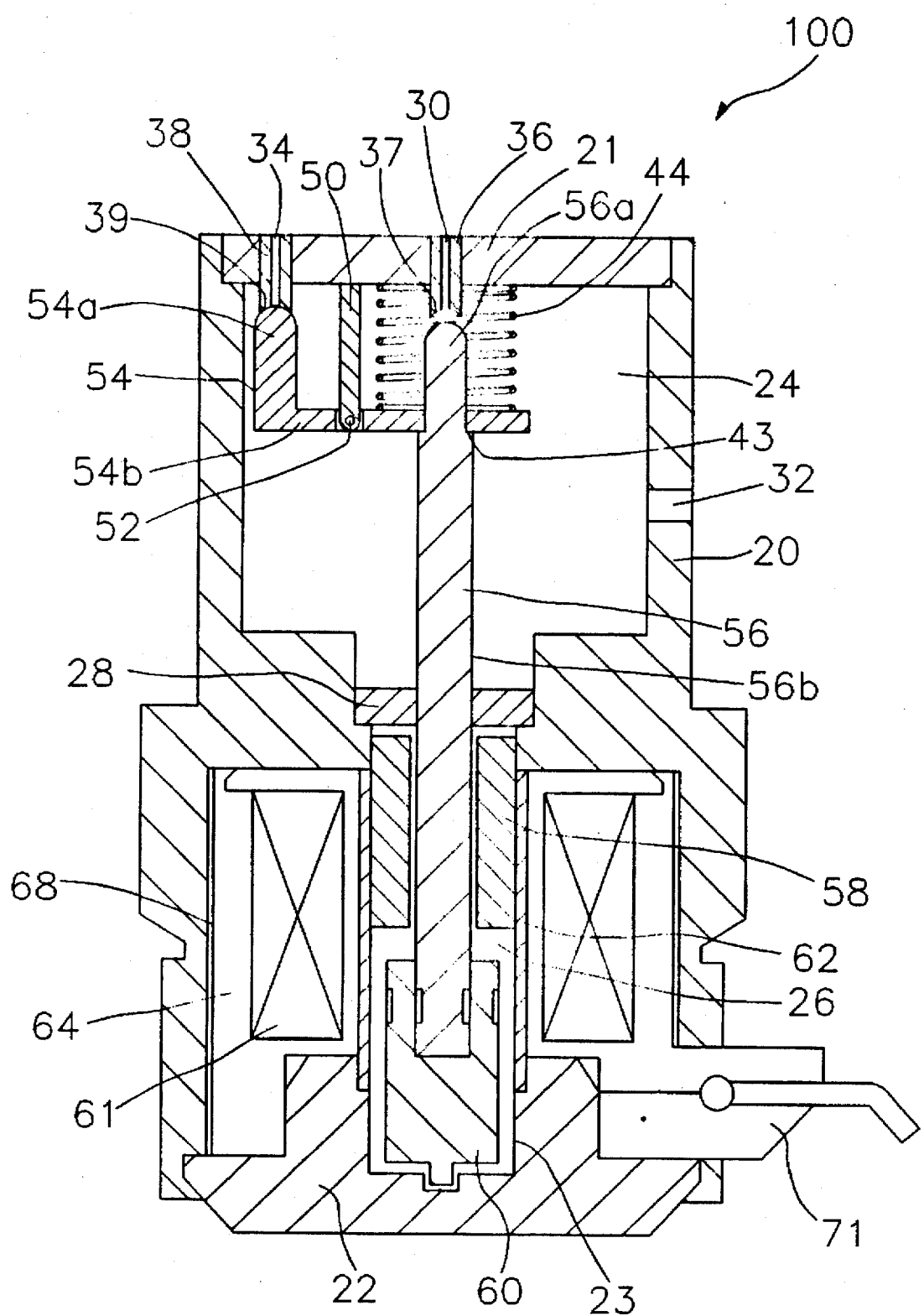

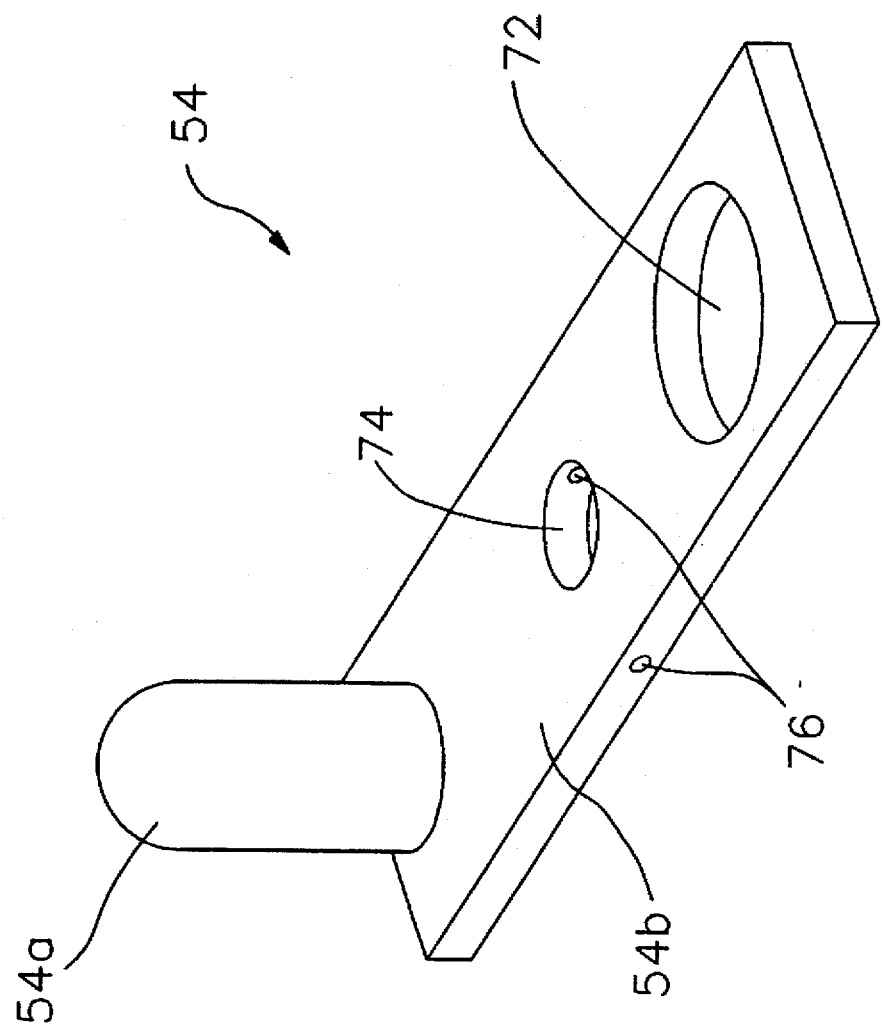

SOLENOID VALVE WITH A HINGED STRUCTURE

BACKGROUND OF THE INVENTION

1. Field of the Invention

The present invention relates to a solenoid valve, and more particularly to a 2-position 3-way solenoid valve for an anti-lock brake system having excellent assemblage and workability with a simple structure.

2. Description of the Prior Art

Currently, an anti-lock brake system which prevents locking of wheels during performing a braking operation of a vehicle to shorten a braking distance and improve steering is mounted to various vehicles. If wheels are locked during the braking operation to slide along a road surface, a frictional force between tires and the road surface is decreased to lengthen the braking distance and abruptly degrade a steering performance of a vehicle. The anti-lock brake system repeatedly increases, maintains or decreases a braking pressure exerted upon the wheels to impede the locking of wheels. It is generally referred to that the increase of the braking pressure is designated as an increase mode, maintaining thereof is a hold mode, and decreasing thereof is a decrease mode. An anti-lock brake system is generally formed of a pressure generating source which is not a master cylinder, i.e., a pump and the like, valves operated by an electric signal, sensors for monitoring a rotating speed of the wheels and a controller for switching the valves in accordance with a predetermined algorithm in order to attain an effective braking operation.

FIG. 1 is a schematic circuit diagram of a hydraulic system showing an anti-lock brake system utilizing two 2-position 2-way (hereinafter simply referred to as "2/2") solenoid valves of normally open and normally closed types. In an increase mode, no current is supplied to first and second 2/2 solenoid valves S220 and S221 to open first valve S220 provided to an outlet side of a hydraulic pump 120 and close second valve S221 provided to an inlet side of hydraulic pump 120, so that the pressure generated from hydraulic pump 120 is supplied to brake wheel cylinders mounted to wheels after being buffered by a damper 130. In a hold mode, a current signal is supplied to first valve S220 to close it, thereby maintaining the constant pressure of the brake wheel cylinder. In a decrease mode, a current signal is supplied to first and second valves S220 and S221 to close first valve S220 and open second valve S221, so that the brake wheel cylinders and an accumulator 110 are communicated with each other. Thus, the braking pressure is decreased. Such a system is stably operated, but two solenoid valves are employed with respect to a single channel to require eight solenoid valves in a 4-channel brake system. Therefore, the required number of valves is increased, and the overall brake system becomes bulky.

Meanwhile, in order to reduce the number of solenoid valves, an anti-lock brake system using 3-position 3-way (hereinafter simply referred to as "3/3") solenoid valves as shown in FIG. 2 has been developed which is currently available. When 3/3 solenoid valves are used in an anti-lock brake system, one solenoid valve is employed per channel to reduce the overall number of solenoid valves by half in comparison with employment of the 2/2 solenoid valves. However, the structure of solenoid valve is complicated, the size thereof is large, and erroneous operations may be caused because 2-step voltage control is necessary to actuate the 3/3 solenoid valve. As a result, the system is operated unstably. Recently, an anti-lock brake system has been developed using 2-position 3-way (hereinafter simply referred to as "2/3") solenoid valves. A 2/3 solenoid valve is disclosed in U.S. Pat. No. 5,207,245, issued to Maranzano on May 4, 1993. In the conventional solenoid valve, the structure thereof is complicated and the flow passages are formed by penetrating the solenoid valve. If the solenoid valve is used to form a modulator, a modulator block is divided into upper and lower blocks to have respective flow passages connected to the respective ports of the solenoid valve. As a result, the structure of the modulator is complicated to deteriorate the assemblage as well as degrade workability.

SUMMARY OF THE INVENTION

The present invention is devised to solve the foregoing problems. An object of the present invention is to provide a 2/3 solenoid valve with a hinged structure, the solenoid valve having a simple structure and being capable of simplifying a structure of a modulator block.

To achieve the above object of the present invention, there is provided a 2/3 solenoid valve comprising:

a valve body with first to third ports composed of a cylindrical hollow housing and first and second covers hermetically coupled to the housing for closing both ends of the housing;

a diaphragm having a hole for partitioning a chamber defined by the housing and the first and second covers into first and second chambers, the first chamber being communicated with the first to third ports;

valve means extending from the first chamber to the second chamber through the hole for opening one of the first and third ports and closing the other one thereof in response to electric signal, the valve means being positioned at a first position of closing the third port and opening the first port in a normal state that the electric signal is not applied or at a second position of opening the third port and closing the first port in an active state that the electric signal is applied, whereby the first and second ports are communicated with each other or the second and third ports are communicated with each other; and a solenoid assembly disposed within the second chamber to surround portion of the valve means and having an annular solenoid coil, an annular bobbin wound by the solenoid coil and a pair of electrodes electrically connected to the solenoid coil and exposed to the exterior of the valve body for moving the valve means to the second position from the first position in response to the electric signal.

The first cover and the diaphragm define the first chamber, the second cover and the diaphragm define the second chamber, the first port is provided at the center of the first cover, the third port is provided at the first cover apart from the first port at a distance, and the second port is provided to the housing.

Preferably, the valve means comprises:

first valve means for opening/closing the first port, reciprocally movable in response to magnetic force generated from the solenoid assembly and composed of an armature disposed coaxially with the valve body adjacent to the second cover within the second chamber, a push rod extending to the first chamber from the second chamber through the hole and having one end thereof fixed to the armature in a coaxial relationship, and a first spool coaxially provided to the other end of the push rod and having a smaller diameter than the push rod;

second valve means for opening/closing the third port, composed of a supporting rod provided between the first and third ports in parallel with the first valve means and having one end thereof fixed to the first cover, and L-shaped hinged valve means having a second spool for opening/closing the third port and a valve lever extending perpendicularly to the second spool to be engaged with a step formed to coupling portion of the push rod and the first spool by the diametric difference and coupling with the other end of the supporting rod by a pin; and a spring interposed between the valve lever and the first cover to surround the first spool for pressing the valve lever, and the first and second valve means are operatively connected with each other by the resilient force of the spring.

For example, the valve lever is a rectangular flat plate having a first hole provided to the other end of the valve lever longitudinally opposite to one end thereof to which the second spool is fixed for inserting the first spool and a second hole provided between both ends thereof for inserting the other end of the supporting rod, the supporting rod and the valve lever are connected with each other by the pin so that both ends of the valve lever are rocked, and the size and shape of the first hole is determined so that the first spool can pass through and the push rod cannot, whereby the step and the valve lever are engaged with each other by the resilient force of the spring.

BRIEF DESCRIPTION OF THE DRAWINGS

The above object and other advantages of the present invention will become more apparent by describing in detail preferred embodiment thereof with reference to the attached drawings in which:

FIG. 3 is a sectional view showing a 2/3 solenoid valve according to the present invention;

FIG. 5 is a perspective view showing an example of a hinged valve included in the solenoid valve according to the present invention.

DETAILED DESCRIPTION OF THE PREFERRED EMBODIMENT

Figure 1:
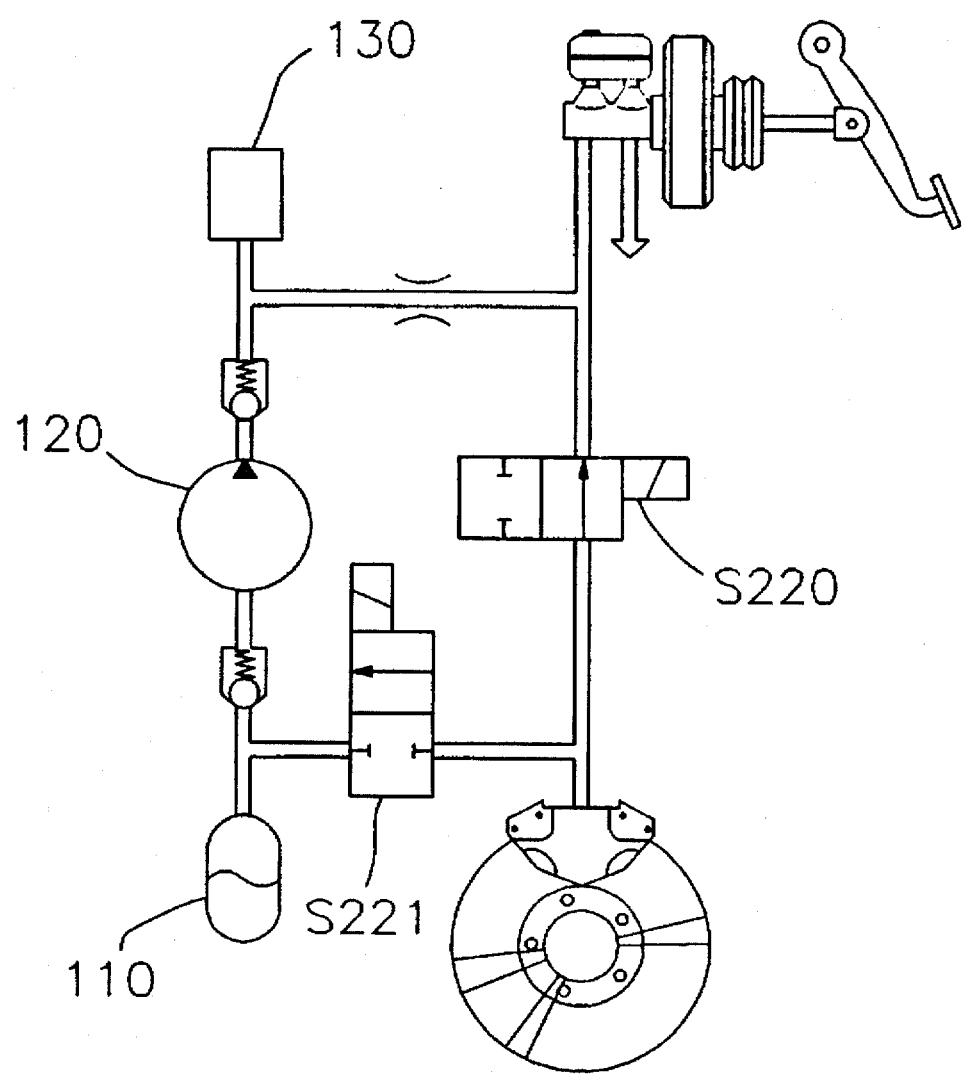
FIG. 1 is a schematic view showing a hydraulic system of a conventional anti-lock brake system utilizing 2/2 solenoid valves.
Figure 2:
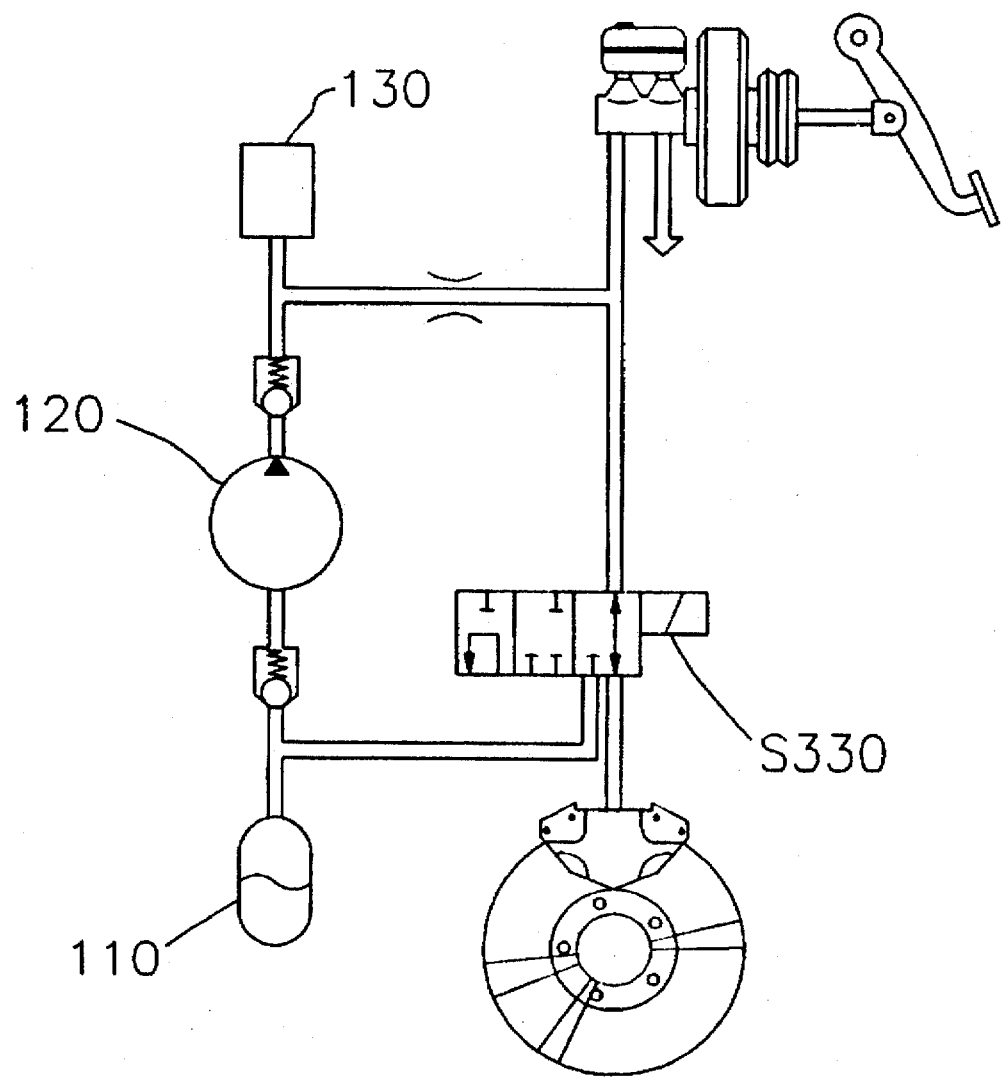
FIG. 2 is a schematic view showing a hydraulic system of a conventional anti-lock brake system utilizing 3/3 solenoid valves.

The preferred embodiment of a 2/3 solenoid valve according to the present invention will be described in detail with reference to FIG. 3.

The 2/3 solenoid valve 100 according to this embodiment includes a hollow cylindrical housing 20 and covers 21 and 22 hermetically coupled to both ends of housing 20. Cover 21 is a circular flat plate, and cover 22 includes a cylindrical depression 23 of a predetermined dimension at the center of one side thereof. A bushing 28 is fitted into housing 20, and first and second chambers 24 and 26 are provided within housing 20, wherein cover 21 and bushing 28 define first chamber 24, and cover 22 and bushing 28 define second chamber 26. First chamber 24 is communicated with each of first, second and third ports 30, 32 and 34. First port 30 is a nozzle hole of an inlet nozzle 36 provided at the center of cover 21, second port 32 is a opening formed to a side wall of housing 20, and third port 34 is a nozzle hole of exhaust nozzle 38 provided to cover 21 apart from inlet nozzle 36.

First chamber 24 contains a spring 44, a supporting rod 50, pin 52 and a hinged valve 54. A push rod 56 extends to first chamber 24 from second chamber 26 through bushing 28 and is installed to reciprocate along the longitudinal direction of housing 20. Moreover, push rod 56 is disposed coaxially with inlet nozzle 36 to open/close first port 30 by its reciprocative movement. Bushing 28 serves for supporting push rod 56 and an opening through which push rod 56 passes is formed at the center thereof. A rod seating surface 37 formed on inlet nozzle 36 and one end of push rod 56 to be seated thereon are shaped to open/close inlet nozzle 36 by the mutual matching.

Push rod 56 is divided into a small outer-diametric portion 56a and a large outer-diametric portion 56b on a basis of the difference in outer diameter. Small outer-diametric portion 56a extends by a predetermined length from said one end of push rod 56 seated on inlet nozzle 36, and the remainder of push rod 56 forms large outer-diametric portion 56b. As a result, a step 43 is provided on outer wall of push rod 56.

Figure 4A:
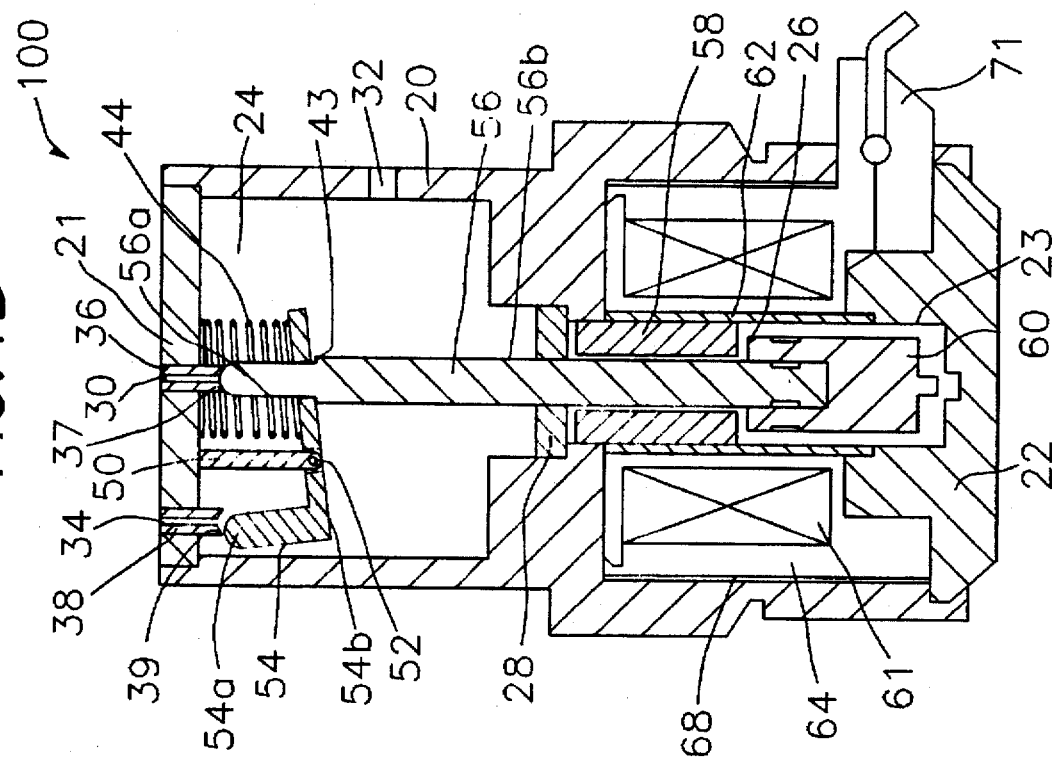
FIGS. 4A and 4B are sectional views showing an operating state of the 2/3 solenoid valve according to the present invention in increase and decrease modes, respectively.

Supporting rod 50 is located parallel to push rod 56 and between inlet nozzle 36 and exhaust nozzle 38, and one end of supporting rod 50 is fixed to cover 21. The other end of supporting rod 50 is coupled, by means of pin 52, with hinged valve 54 for opening/closing exhaust nozzle 38. Hinged valve 54 has an L-shape and is composed of a spool 54a for opening/closing exhaust nozzle 38 and a valve lever 54b perpendicular to spool 54a. An end of spool 54a is shaped to match with a valve seating surface 39 of exhaust nozzle 38. Valve lever 54b is connected to supporting rod 50 by means of pin 52 and extends substantially perpendicular to supporting rod 50 to engage with step 43 formed on the outer wall of push rod 56. Spring 44 is provided between cover 21 and valve lever 54b to surround small outer-diametric portion 56a of push rod 56. Resilient force of spring 44 allows spool 54a of hinged valve 54 to be seated on exhaust nozzle 38 and allows push rod 56 to be detached from inlet nozzle 36, whereby first port 30 is open and third port is closed in the inactive state that solenoid coil 61 is de-energized. The solenoid valve 100 of the inactive state is shown in FIG. 4A.

Second chamber 26 contains a core 58 and an armature 60. Armature 60 is coaxially coupled with the other end of push rod 56. Core 58 is fixed to the inner wall of housing 20 and the inner wall of a cylindrical sealing member 62 to surround push rod 56 and has a through hole which push rod 56 passed through at the center thereof. Core 58 is formed of a ferromagnetic material to be magnetized by magnetic flux generated by solenoid coil 61.

An annular solenoid assembly 68 is disposed within second chamber 26 to surround sealing member 62. Solenoid assembly 68 is formed of an annular solenoid coil 61 and a bobbin 64 for winding solenoid coil 61 thereon. Bobbin 64 is integrally formed by molding or the like to prevent the fluid from permeating to solenoid coil 61 which stands wound therein. Additionally, solenoid assembly 68 is provided to surround sealing member 62 by which solenoid assembly 68 is shielded from the fluid within second chamber 26. Electric terminals 71 are exposed to the outside of solenoid valve 100 to be connected to electric wires through which electric power is supplied to solenoid coil 61.

One end of cylindrical sealing member 62 is hermetically fixed to housing 20 by means of a caulking processing or the like, and the other thereof is hermetically fitted to cover 22. Depression 23 of cover 22 accepts part of armature 60.

Figure 4B:
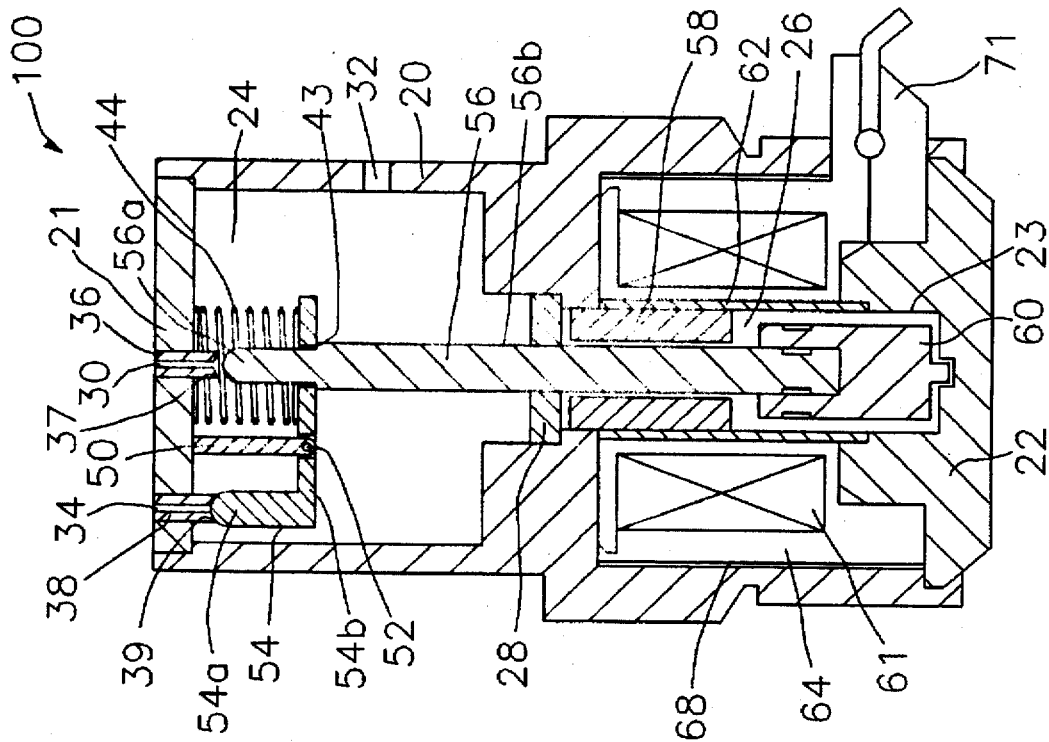

In the active state that solenoid coil 61 is energized, as shown in FIG. 4B, armature 60 moves toward inlet nozzle 36 by overcoming the resilient force of spring 44, so that said one end of push rod 56 is seated on inlet nozzle 36. Additionally, valve lever 54b engaging with step 43 of push rod 56 pivots around pin 52 by the movement of push rod 56, so that spool 54a is detached from exhaust nozzle 38. As a result, first port 30 is closed and third port 34 is open.

FIG. 5 is a perspective view showing an example of hinged valve 54 according to this embodiment. Spool 54a has a cylindrical shape, one end thereof is fixed to valve lever 54b in a perpendicular relationship, and the other end thereof is shaped to match with valve seating surface 39 of exhaust nozzle 38. Valve lever 54b is a rectangular flat plate. A hole 72, through which small outer-diametric portion 56a of push rod 56 passes, is formed to the other end of valve lever 54b opposite to one end thereof to which spool 54a is fixed, and a hole 74 for supporting rod 50 is formed between both ends of valve lever 54b. The diameter of hole 72 is determined so that small outer-diametric portion 56a of push rod 56 can pass therethrough and large outer-diametric portion 56b can't pass therethrough. A pin-inserting hole 76 is transversely formed to intersect hole 74. Hinged valve 54 is not limited as shown and may be changed in various shapes as long as it has the same operational characteristic. For instance, spool 54a may be replaced by a ball.

Figure 6:
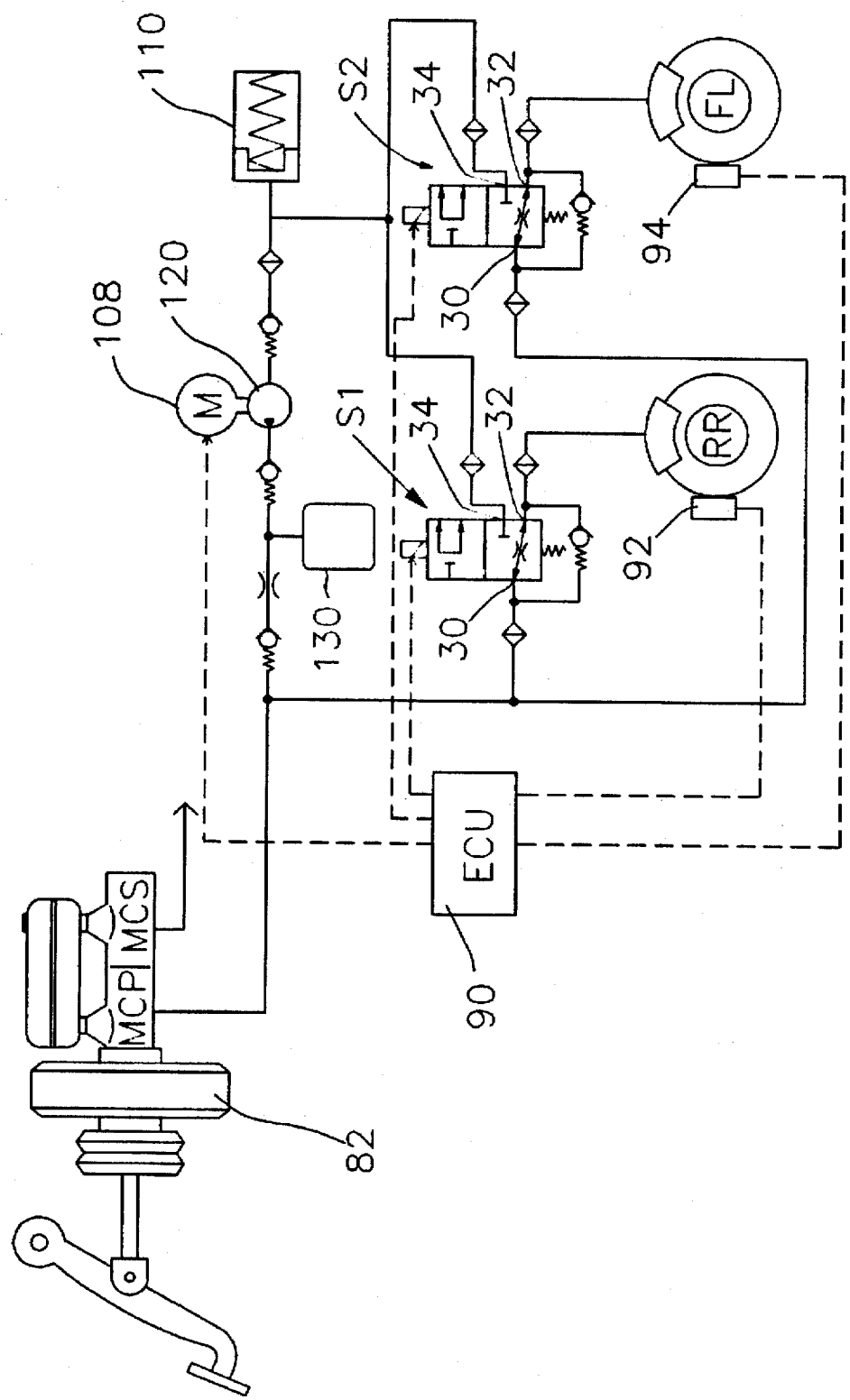
FIG. 6 is a schematic view showing a hydraulic system of an anti-lock brake system utilizing the 2/3 solenoid valve.

FIG. 6 illustrates a schematic view showing a hydraulic system of an anti-lock brake system formed of 2/3 solenoid valves. A first solenoid valve S1 is assigned to a rear-right wheel RR and a second solenoid valve S2 is assigned to a front-left wheel FL. A master cylinder 82 as shown is a tandem type and is formed of a primary master cylinder MCP and a secondary master cylinder MCS. Primary master cylinder MCP is assigned to front-left and rear-right wheels FL and RR, and secondary master cylinder MCS is assigned to front-right and rear-left wheels not shown. In order to have a good understanding, only the hydraulic circuit connected to primary master cylinder MCP is shown in FIG. 6. First ports 30 of first and second solenoid valves S1 and S2 are communicated with primary master cylinder MCP and the outlet of a pump 120 driven by a motor 108, second ports 32 thereof with brake wheel cylinders (not shown) mounted to wheels, and third ports 34 thereof with an accumulator 110 and the inlet of pump 120. Wheel speed sensors 92 and 94 are mounted to wheels RR and FL, respectively, the input of ECU 90 is electrically connected to wheel speed sensors 92 and 94, and the output thereof to motor 108.

Hereinafter, with reference to FIGS. 3 to 5, the operation of solenoid valve 100 according to the present invention will be described in connection with the operation of an anti-lock brake system formed of the solenoid valves according to the present invention.

In an increase mode, no electric signal is supplied to solenoid valve 100 and hence, as shown in FIG. 4A, spool 54a of hinged valve 54 is seated on valve seating surface 39 of exhaust nozzle 38 by the resilient force of spring 44 to close third port 34. Moreover, push rod 56 is detached from rod seating surface 37 of inlet nozzle 36 by the resilient force to open first port 30. At this time, armature 60 is located adjacent to cover 22.

Consequently, first and second ports 30 and 32 are communicated with each other, so that the hydraulic pressure generated from pump 120 is supplied to the brake wheel cylinders mounted to wheels after passing through first and second ports 30 and 32 and being buffered by a damper 130, whereby the braking pressure is increased.

In a decrease mode, electric signal is supplied to solenoid coil 61. In response to this, as shown in FIG. 4B, armature 60 moves against the resilient force of spring 44, so that push rod 56 is seated on rod seating surface 37 of inlet nozzle 36 to close first port 30. Because valve lever 54b is kept engaged with step 43, both ends of valve lever 54b are rocked in accordance with the movement of push rod 56. By the principle of lever, spool 54a is detached from exhaust nozzle 38 to open third port 34.

Consequently, second and third ports 32 an 34 are communicated with each other, so that the hydraulic pressure of the brake wheel cylinders is exhausted through second and third ports 32 and 34 toward accumulator 110, thereby decreasing the braking pressure.

A hold mode is accomplished by the repetition of energizing and de-energizing of solenoid coil 61 under a pulse-width-modulation control or a bang-bang control, for example. That is, when solenoid coil 61 is de-energized, first port 30 is open and third port 34 is closed, and when solenoid coil 61 is energized, first port 30 is closed and third port 34 is open, whereby the constant braking pressure is maintained.

The 2/3 solenoid valve according to the present invention has a simple structure, and thus the assembling and manufacturing thereof become easy.

In addition, the 2/3 solenoid valve according to the present invention is formed to be partitioned into an electric portion having electric elements and a hydraulic portion associated with the fluid. There is no flow passage passing through the inside of the solenoid valve longitudinally, and ports for admitting/discharging the fluid are formed to a half portion of the solenoid valve.

When the modulator is constructed by utilizing the solenoid valve according to the present invention, flow passages connected to respective ports of the solenoid valve are formed only in one block of two modulator blocks. Therefore, the modulator is simply constructed to improve workability.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A solenoid valve comprising:
   a valve body with first to third ports composed of a cylindrical hollow housing and first and second covers hermetically coupled to said housing for closing both ends of said housing;
   a diaphragm having a hole for partitioning a chamber defined by said housing and said first and second covers into first and second chambers, said first chamber being communicated with said first to third ports;
   valve means extending from said first chamber to said second chamber through said hole for opening one of said first and third ports and closing the other one thereof in response to an electric signal, said valve means being positioned at a first position of closing said third port and opening said first port in a normal state that said electric signal is not applied or at a second position of opening said third port and closing said first port in an active state that said electric signal is applied, whereby said first and second ports are communicated with each other or said second and third ports are communicated with each other; and a solenoid assembly disposed within said second chamber to surround a portion of said valve means and having an annular solenoid coil, an annular bobbin wound by said solenoid coil and a pair of electrodes electrically connected to said solenoid coil and exposed to the exterior of said valve body for moving said valve means to said second position from said first position in response to said electric signal, wherein said first cover and said diaphragm define said first chamber, said second cover and said diaphragm define said second chamber, said first port is provided at a center of said first cover, said third port is provided at said first cover apart from said first port at a distance, and said second port is provided to said housing, wherein said valve means comprises:
first valve means for opening/closing said first port, and reciprocally movable in response to magnetic force generated from said solenoid assembly and composed of an armature disposed coaxially with said valve body adjacent to said second cover within said second chamber, a push rod extending to said first chamber from said second chamber through said hole and having one end thereof fixed to said armature in a coaxial relationship, and a first spool coaxially provided to the other end of said push rod and having a smaller diameter than said push rod;

second valve means for opening/closing said third port, composed of a supporting rod provided between said first and third ports in parallel with said first valve means and having one end thereof fixed to said first cover, and L-shaped hinged valve means having a second spool for opening/closing said third port and a valve lever extending perpendicularly to said second spool to be engaged with a step formed to coupling portion of said push rod and said first spool by the diametric difference and coupling with the other end of said supporting rod by a pin; and a spring interposed between said valve lever and said first cover to surround said first spool for pressing said valve lever, and said first and second valve means are operatively connected with each other by the resilient force of said spring.

2. The solenoid valve as claimed in claim 1, further comprising a cylindrical sealing member provided within said second chamber coaxially with said housing, wherein said bobbin is provided to surround said sealing member, and one end of said sealing member is hermetically coupled with the inner wall of said housing and the other end thereof is hermetically fitted to a groove formed to said second cover in order to protect said bobbin from the fluid.

3. The solenoid valve as claimed in claim 1, wherein said first port is a nozzle hole of an inlet nozzle provided at the center of said first cover, said second port is an opening provided to said housing, said third port is a nozzle hole of an exhaust nozzle provided to said first cover apart from said inlet nozzle, and said diaphragm is a bushing.

4. The solenoid valve as claimed in claim 1, wherein said first cover is a circular flat plate, and said second cover has a depression for accepting portion of said armature at the center of a side of said second cover.

5. The solenoid valve as claimed in claim 1, wherein said valve lever is a rectangular flat plate having a first hole provided to the other end of said valve lever longitudinally opposite to one end thereof to which said second spool is fixed for inserting said first spool and a second hole provided between both ends thereof for inserting the other end of said supporting rod, said supporting rod and said valve lever are connected with each other by said pin so that both ends of said valve lever are rocked, and the size and shape of said first hole is determined so that said first spool can pass through and said push rod cannot, whereby said step and said valve lever are engaged with each other by the resilient force of said spring.

6. A solenoid valve comprising:
a valve body with first to third ports composed of a cylindrical hollow housing and first and second covers hermetically coupled to said housing for closing both ends of said housing;

a diaphragm having a hole for partitioning a chamber defined by said housing and said first and second covers into first and second chambers, said first chamber being communicated with said first to third ports;

valve means extending from said first chamber to said second chamber through said hole for opening one of said first and third ports and closing the other one thereof in response to electric signal, said valve means being positioned at a first position of closing said third port and opening said first port in a normal state that said electric signal is not applied or at a second position of opening said third port and closing said first port in an active state that said electric signal is applied, whereby said first and second ports are communicated with each other or said second and third ports are communicated with each other; and a solenoid assembly disposed within said second chamber to surround portion of said valve means and having an annular solenoid coil, an annular bobbin wound by said solenoid coil and a pair of electrodes electrically connected to said solenoid coil and exposed to the exterior of said valve body for moving said valve means to said second position from said first position in response to said electric signal, and further comprising a cylindrical sealing member provided within said second chamber coaxially with said housing, wherein said first cover and said diaphragm define said first chamber, said second cover and said diaphragm define said second chamber, said first port is provided at a center of said first cover, said third port is provided at said first cover apart from said first port at a distance, and said second port is provided to said housing, wherein said valve means comprises:
first valve means for opening/closing said first port, reciprocally movable in response to magnetic force generated from said solenoid assembly and composed of an armature disposed coaxially with said valve body adjacent to said second cover within said second chamber, a push rod extending to said first chamber from said second chamber through said hole and having one end thereof fixed to said armature in a coaxial relationship, and a first spool coaxially provided to the other end of said push rod and having a smaller diameter than said push rod;

second valve means for opening/closing said third port, composed of a supporting rod provided between said first and third ports in parallel with said first valve means and having one end thereof fixed to said first cover, and L-shaped hinged valve means having a second spool for opening/closing said third port and a valve lever extending perpendicularly to said second spool to be engaged with a step formed to coupling portion of said push rod and said first spool by the diametric difference and coupling with the other end of said supporting rod by a pin; and a spring interposed between said valve lever and said first cover to surround said first spool for pressing said valve lever, and said first and second valve means are operatively connected with each other by the resilient force of said spring, wherein said bobbin is provided to surround said sealing member, and one end of said sealing member is hermetically coupled with the inner wall of said housing and the other end thereof is hermetically fitted to a groove formed to said second cover in order to protect said bobbin from the fluid, wherein said first port is a nozzle hole of an inlet nozzle provided at the center of said first cover, said second port is an opening provided to said housing, said third port is a nozzle hole of an exhaust nozzle provided to said first cover apart from said inlet nozzle, and said diaphragm is a bushing, wherein said first cover is a circular flat plate, and said second cover has a depression for accepting portion of said armature at the center of a side of said second cover, and wherein said valve lever is a rectangular flat plate having a first hole provided to the other end of said valve lever longitudinally opposite to one end thereof to which said second spool is fixed for inserting said first spool and a second hole provided between both ends thereof for inserting the other end of said supporting rod, said supporting rod and said valve lever are connected with each other by said pin so that both ends of said valve lever are rocked, and the size and shape of said first hole is determined so that said first spool can pass through and said push rod cannot, whereby said step and said valve lever are engaged with each other by the resilient force of said spring.

* * * * *